United States Patent
Farahati et al.

(10) Patent No.: US 10,260,584 B2
(45) Date of Patent: Apr. 16, 2019

(54) WET FRICTION MATERIAL HAVING INCREASED PRESSURE CYCLE LIFE

(71) Applicant: Schaeffler Technologies AG & Co. KG, Herzogenaurach (DE)

(72) Inventors: Rashid Farahati, Copley, OH (US); Zhiru Shi, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 128 days.

(21) Appl. No.: 15/460,588

(22) Filed: Mar. 16, 2017

(65) Prior Publication Data

US 2018/0266507 A1 Sep. 20, 2018

(51) Int. Cl.
*F16D 69/02* (2006.01)
*F16H 45/02* (2006.01)
*F16D 25/0635* (2006.01)

(52) U.S. Cl.
CPC ....... *F16D 69/026* (2013.01); *F16D 25/0635* (2013.01); *F16H 45/02* (2013.01); *F16H 2045/0221* (2013.01); *F16H 2045/0289* (2013.01)

(58) Field of Classification Search
None
See application file for complete search history.

(56) References Cited

U.S. PATENT DOCUMENTS

| | | | | |
|---|---|---|---|---|
| 3,684,062 A * | 8/1972 | Johnson | ................... | F16D 65/08 188/251 A |
| 4,226,816 A * | 10/1980 | Yamamoto | .............. | F16D 69/02 162/145 |
| 4,420,571 A * | 12/1983 | Blickensderfer | ........ | C08G 8/04 523/149 |
| 5,585,166 A | 12/1996 | Kearsey | | |
| 5,775,468 A | 7/1998 | Lam et al. | | |
| 5,989,375 A | 11/1999 | Bortz | | |
| 6,182,804 B1 | 2/2001 | Lam | | |
| 6,194,059 B1 | 2/2001 | Yesnik | | |
| 8,932,713 B2 | 1/2015 | Asakawa et al. | | |
| 2005/0039872 A1 | 2/2005 | Kimura et al. | | |
| 2006/0016655 A1 * | 1/2006 | Sakai | ..................... | F16D 13/64 192/3.29 |

(Continued)

FOREIGN PATENT DOCUMENTS

| | | |
|---|---|---|
| JP | 09132769 A | 5/1997 |
| JP | 2005281556 A | 10/2005 |
| JP | 2012046608 A | 3/2012 |

OTHER PUBLICATIONS

International Search Report and Written Opinion for International Application No. PCT/US2018/021950 dated Jun. 25, 2018.

*Primary Examiner* — Timothy Hannon

(74) *Attorney, Agent, or Firm* — Brooks Kushman P.C.

(57) ABSTRACT

A friction material for a clutch pad, including a fiber material and a filler material. The fiber material includes a first surface, a second surface opposite the first surface and a thickness between the first and second surfaces. The filler material includes tung oil and phenolic resin. The tung oil is saturated within the fiber material from the first surface through a first portion of the thickness, while the phenolic resin is saturated within the fiber material from the second surface through a second portion of the thickness.

13 Claims, 3 Drawing Sheets

(56) References Cited

U.S. PATENT DOCUMENTS

2012/0108698 A1\* 5/2012 Lam .................. F16D 69/026
 523/156
2013/0037373 A1 2/2013 Dong et al.
2013/0202903 A1\* 8/2013 Asakawa ............ F16D 69/026
 428/499

\* cited by examiner

WET FRICTION MATERIAL HAVING INCREASED PRESSURE CYCLE LIFE

TECHNICAL FIELD

The present disclosure relates to friction materials, more particularly to a friction material for a powertrain, and even more particularly to a friction material for a powertrain having multiple layers arranged to increase performance of the friction material while increasing pressure cycle fatigue life.

BACKGROUND

Friction materials, in particular, friction materials used in vehicle powertrains, are often formed from a base material, e.g., fibrous paper, which is saturated with a resin, e.g., phenolic resin, and subsequently cured. The cured friction material is more durable than the base material on its own, as the resin acts as a glue-like material holding the fibrous paper together. The combination can be quite strong. For example, such a friction material may be used in a vehicle transmission where it will be exposed to aggressive environmental conditions such as elevated temperatures typically ranging from 180° C. to 200° C. Exposure to temperatures above about 220° C. can result in decomposition of some phenolic resins.

Tung oil is added to the phenolic resin as it increases the flexibility of the cured resin, and improves durability of friction material in pressure cycles at higher temperatures. However, friction material performance decreases when tung oil is added, i.e., the low speed and static friction coefficients increase and the dynamic friction coefficient decreases which results in higher operating temperatures. The foregoing results in decreased performance in clutch applications.

Some known friction materials delaminate under aggressive conditions, e.g., shearing of layers. Additionally, some known friction materials crack or wear away.

SUMMARY

According to aspects illustrated herein, there is provided a friction material including a fiber material and a filler material. The fiber material includes a first surface, a second surface opposite the first surface and a thickness between the first and second surfaces. The filler material includes tung oil and phenolic resin. The tung oil is saturated within the fiber material from the first surface through a first portion of the thickness, while the phenolic resin is saturated within the fiber material from the second surface through a second portion of the thickness.

According to aspects illustrated herein, there is provided a friction material including a fiber material, a filler material and a friction layer. The fiber material includes a first surface, a second surface opposite the first surface and a thickness between the first and second surfaces. The filler material includes tung oil saturated within the fiber material from the first surface through a first portion of the thickness. The friction layer includes phenolic resin saturated within the fiber material from the second surface through a second portion of the thickness.

According to aspects illustrated herein, there is provided a torque converter, including a cover, an impeller connected to the cover, a turbine in fluid communication with the impeller, an output hub arranged to non-rotatably connect to an input shaft for a transmission, and a torque converter clutch. The torque converter clutch includes a fiber material, a filler material and a piston. The fiber material includes a first surface, a second surface opposite the first surface and a thickness between the first and second surfaces. The filler material includes tung oil and phenolic resin. The tung oil is saturated within the fiber material from the first surface through a first portion of the thickness, while the phenolic resin is saturated within the fiber material from the second surface through a second portion of the thickness. The piston is displaceable to engage the friction material with the piston and the cover to transmit torque from the cover to the output hub through the friction material and piston.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims. It should be understood that any methods, devices or materials similar or equivalent to those described herein can be used in the practice or testing of the disclosure.

By "non-rotatably connected" first and second components we mean that the first component is connected to the second component so that any time the first component rotates, the second component rotates with the first component, and any time the second component rotates, the first component rotates with the second component. Axial displacement between the first and second components is possible.

Figure 1:
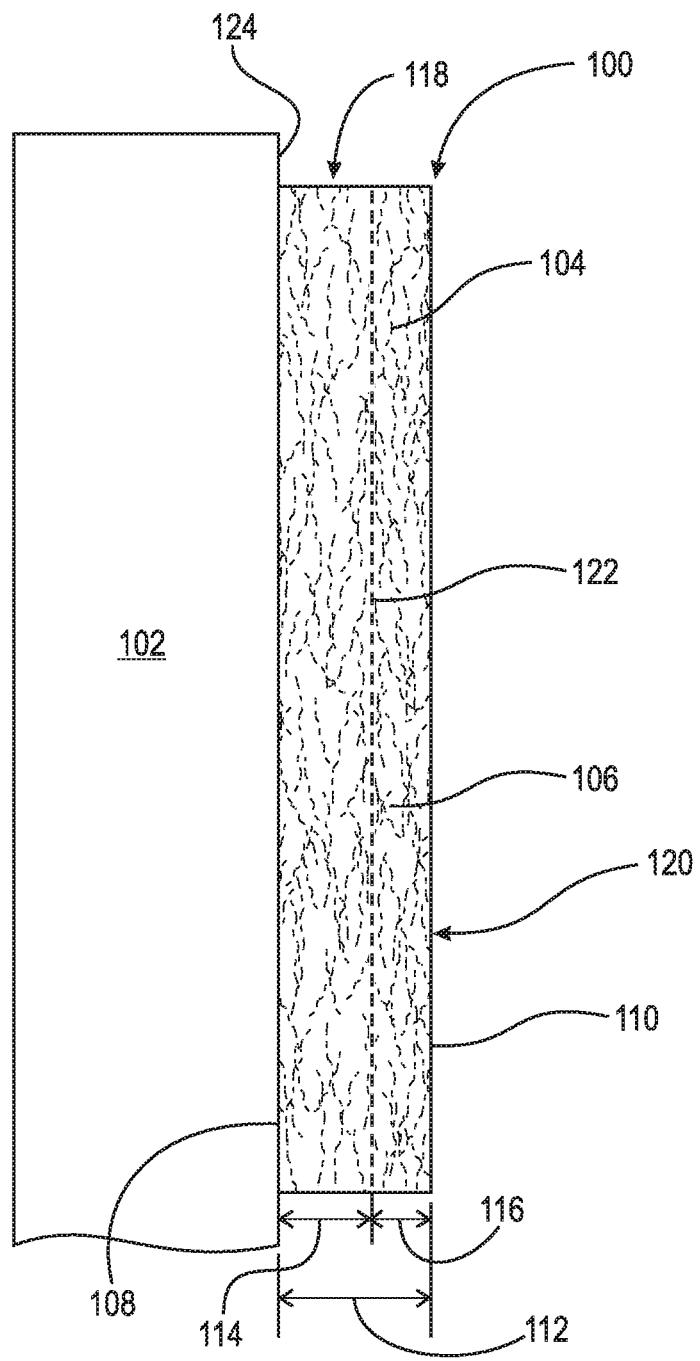
FIG. 1 a schematic cross-sectional view of an example embodiment of friction material including tung oil and phenolic resin.

FIG. 1 is a schematic cross-sectional view of friction material 100 including tung oil and phenolic resin. Friction material 100 can be used on any clutch plate 102 known in the art. In an example embodiment, friction material 100 is fixedly secured to plate 102. Friction material 100 includes fiber material 104 and filler material 106 including tung oil and phenolic resin. Fiber material 104 can be any organic or inorganic fiber known in the art, for example including but not limited to cellulose fibers or carbon fibers.

In an example embodiment, friction material 100 comprises fiber material 104. Fiber material 104 comprises first surface 108, second surface 110 opposite first surface 108 and thickness 112 between first and second surfaces 108 and 110, respectively. Filler material 106 comprises tung oil and phenolic resin. The tung oil is saturated within fiber material 104 from first surface 108 through first portion 114 of thickness 112 and the phenolic resin is saturated within fiber material 104 from second surface 110 through second portion 116 of thickness 112.

In an example embodiment, friction material 100 comprises fiber material 104 comprising first surface 108, second surface 110 opposite first surface 108 and thickness 112 between first and second surfaces 108 and 110, respectively. Filler layer 118 comprises tung oil saturated within fiber material 104 from first surface 108 through first portion 114 of thickness 112. Friction layer 120 comprises phenolic resin saturated within fiber material 104 from second surface 110 through second portion 116 of thickness 112.

In an example embodiment, tung oil is applied to only first surface 108 in order to avoid introduction of tung oil into the phenolic resin, which is applied in a subsequent operation as described herebelow. However, it should be appreciated that mixing or blending of tung oil and phenolic resin does not adversely affect pressure cycle life at higher temperatures and does not result in a performance loss of friction material 100 provided that the exposed surface of phenolic resin, i.e., second surface 110, does not blend or mix with tung oil. Thus, in an example embodiment, tung oil is applied to first surface 108, and affects only the characteristics of first portion 114 of fiber material 104. In an example embodiment, first surface 108 consists of the tung oil. In other terms, there is no mixing or blending of tung oil and phenolic resin at first surface 108. In an example embodiment, first portion 114 of thickness 112 ranges between 25% and 99% of thickness 112. It has been found that the higher the percentage of thickness 112 comprising tung oil, the greater of friction material 100. However, the quantity of tung oil, i.e., the percentage of thickness 112 comprising tung oil, cannot be so high that tung oil presents through all of thickness 112, i.e., presents at second surface 110.

In an example embodiment, phenolic resin is applied to only second surface 110 in order to avoid introduction of phenolic resin into the tung oil, which is applied in a prior operation as described above and in further detail herebelow. Thus, in an example embodiment, second surface 110 consists of the phenolic resin. Phenolic resin saturates second portion 116 of thickness 112, and after fully curing, provides strength to friction material 100, in particular in temperature, shear and pressure. An example of a suitable phenolic resin includes a nitrile phenolic material sold under the name Arofene 1166 by Ashland Chemical (Covington, Ky.).

In an example embodiment, first surface 108 consists of the tung oil and second surface 110 consists of the phenolic resin. In an example embodiment, blending of the tung oil and the phenolic resin only occurs proximate interface 122 between first and second portions 114 and 116, respectively, of thickness 112.

In addition to the embodiments of friction material discussed above, various embodiments of methods of forming the present friction material are discussed herebelow. In an example embodiment, friction material 100 is formed in part by saturating tung oil in fiber material 104. Fiber material 104 may be saturated with lung oil by various methods. In an example embodiment, tung oil is dissolved or thinned in ethanol, or any other suitable volatile solvent that has the capacity to lower the density of or thin tung oil, e.g., methanol. Subsequently, the thinned tung oil is applied to first surface 108 and permitted to wick into and saturate first portion 114 of fiber material 104. In example embodiments, the thinned tung oil is applied by spraying, roller coated, knife coated, alternatively by contacting the fiber material with a pool of thinned tung oil, or any other means of coating known in the art. It has been found that the depth of penetration of the saturation may be controlled by various techniques. In an example embodiment, the percentage of thickness 112 saturated with tung oil is controlled by adjusting the density of tung oil, i.e., the lower the density, the greater the percentage of saturation. In example embodiments, a solution comprising about 20 wt % to about 55 wt % tung oil with the balance being a solvent such as ethanol has been found to provide acceptable percentages of thickness 112 saturated with tung oil while preventing tung oil from presenting at second surface 110. However, it must be appreciated that the appropriate composition quantities are dependent on more than the tung oil alone. For example, a first type of fiber material may require a solution comprising about 25% wt % tung oil, while a second type of fiber material may require a solution comprising 35 wt % tung oil to result in the same percent of saturation. Furthermore, the tung oil may be applied to fiber material 104 while the material is in its original form, e.g., an uncut roll of fiber material, or may be applied after the material is cut into a final form, e.g., a disk. In an example embodiment, after applying the tung oil solution to fiber material 104, the solvent is evaporated by air drying at ambient or elevated temperatures, and optionally with convective air flow. It should be appreciated that it is not necessary to fully evaporate the solvent prior to performing the subsequent step of introducing the phenolic resin.

Next, in an example embodiment, phenolic resin is applied to fiber material 104. Fiber material 104 may be saturated with phenolic resin by various methods. In an example embodiment, phenolic resin is dissolved or thinned in ethanol, or any other suitable volatile solvent that has the capacity to lower the density of or thin phenolic resin, e.g., methanol. Subsequently, the thinned phenolic resin is applied to second surface 110 and permitted to wick into and saturate second portion 116 of fiber material 104. In example embodiments, the thinned phenolic resin is applied by spraying, roller coated, knife coated, alternatively by contacting the fiber material with a pool of thinned phenolic resin, by dipping fiber material 104 within the thinned phenolic resin, or any other means of coating known in the art. It has been found that the depth of penetration of the saturation may be controlled by various techniques. In an example embodiment, the percentage of thickness 112 saturated with phenolic resin is controlled by adjusting the density of phenolic resin, i.e., the lower the density, the greater the percentage of saturation. In example embodiments, a solution comprising about 15 wt % to about 40 wt % phenolic resin with the balance being a solvent such as ethanol have been found to provide acceptable percentages of thickness 112 saturated with phenolic resin, i.e., fully saturating the entire thickness of second portion 116. However, it must be appreciated that the appropriate composition quantities are dependent on more than the phenolic resin alone. For example, a first type of fiber material may require a solution comprising about 25 wt % phenolic resin, while a second type of fiber material may require a solution comprising 35 wt % phenolic resin to result in the same percent of saturation. In an example embodiment, after applying the phenolic resin solution to fiber material 104, the solvent is evaporated by air drying at ambient or elevated temperatures, and optionally with convective air flow. It should be appreciated that it is not necessary to fully evaporate the solvent prior to performing subsequent steps.

In an example embodiment, fiber material 104 including the tung oil and the phenolic resin are partially cured, e.g., by passing coated fiber material 104 through a drying oven. The partial cure removes solvent and tackiness from both the tung oil and the phenolic resin solutions. The phenolic resin is partially cured during this operation.

As described above, fiber material 104 may be saturated with tung oil and phenolic resin in an unmodified form, e.g., a large roll, or may be saturated after modification, e.g., stamped into disk form. Thus, in an example embodiment, the partially cured fiber material 104 is modified into an alternate form, e.g., a disk shape.

Subsequently, in an example embodiment, the partially cured and modified fiber material 104 is bonded to a backing structure, e.g., plate 102. An adhesive is applied to either or both of first surface 108 and surface 124 of plate 102. A variety of adhesive types may be used for this operation, e.g., a phenolic based adhesive. It should be appreciated that the phenolic based adhesive is not the same phenolic resin used in the filler material and friction layer. In an example embodiment, after securing the partially cured and modified fiber material 104 to the backing structure, the assembly is positioned within a hot press wherein pressure and heat is applied to the assembly thereby curing the tung oil, melting and curing the phenolic resin and fully bonding friction material 100 to plate 102, i.e., fully curing the adhesive. In an example embodiment, the hot press is held at a temperature of about 400° F. to about 425° F. In an example embodiment, the assembly is held within the hot press for the curing operation for about 30 seconds to about 3 minutes.

Figure 2:
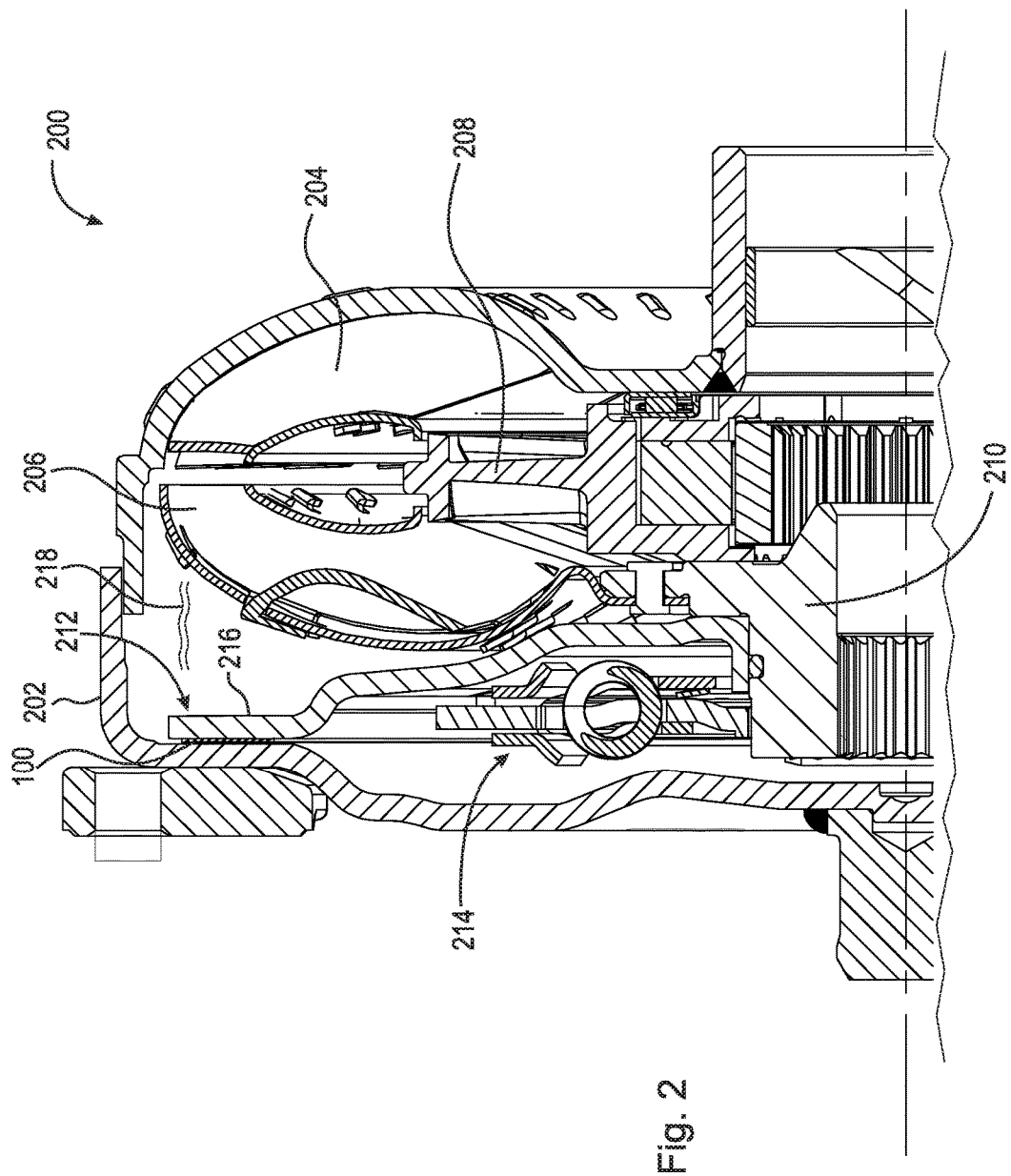
FIG. 2 is a partial cross-sectional view of an example torque converter including the friction material shown in FIG. 1; and, FIG. 3 is a graph plotting respective percent thickness loss versus cycles for known friction material and friction material including tung oil and phenolic resin.

FIG. 2 is a partial cross-sectional view of example torque converter 200 including friction material 100 shown in FIG. 1. Torque converter 200 includes cover 202, impeller 204 connected to the cover, turbine 206 in fluid communication with the impeller, stator 208, output hub 210 arranged to non-rotatably connect to an input shaft (not shown) for a transmission, torque converter clutch 212, and vibration damper 214. Clutch 212 includes friction material 100 and piston 216. As is known in the art, piston 216 is displaceable to engage friction material 100 with piston 216 and cover 202 to transmit torque from cover 202 to output hub 210 through friction material 100 and piston 216. Fluid 218 is used to operate clutch 212.

Although a particular example configuration of torque converter 200 is shown in FIG. 2, it should be understood that the use of friction material 100 in a torque converter is not limited to a torque converter as configured in FIG. 2. That is, material 100 is usable in any clutch device, using friction material, for any torque converter configuration known in the art. Moreover, friction material 100 may also be used in any wet clutch system or application, e.g., a clutch pack, a transmission, etc. Still further, friction material 100 may be adhered to one or both sides of a plate, e.g., a clutch plate.

Figure 3:
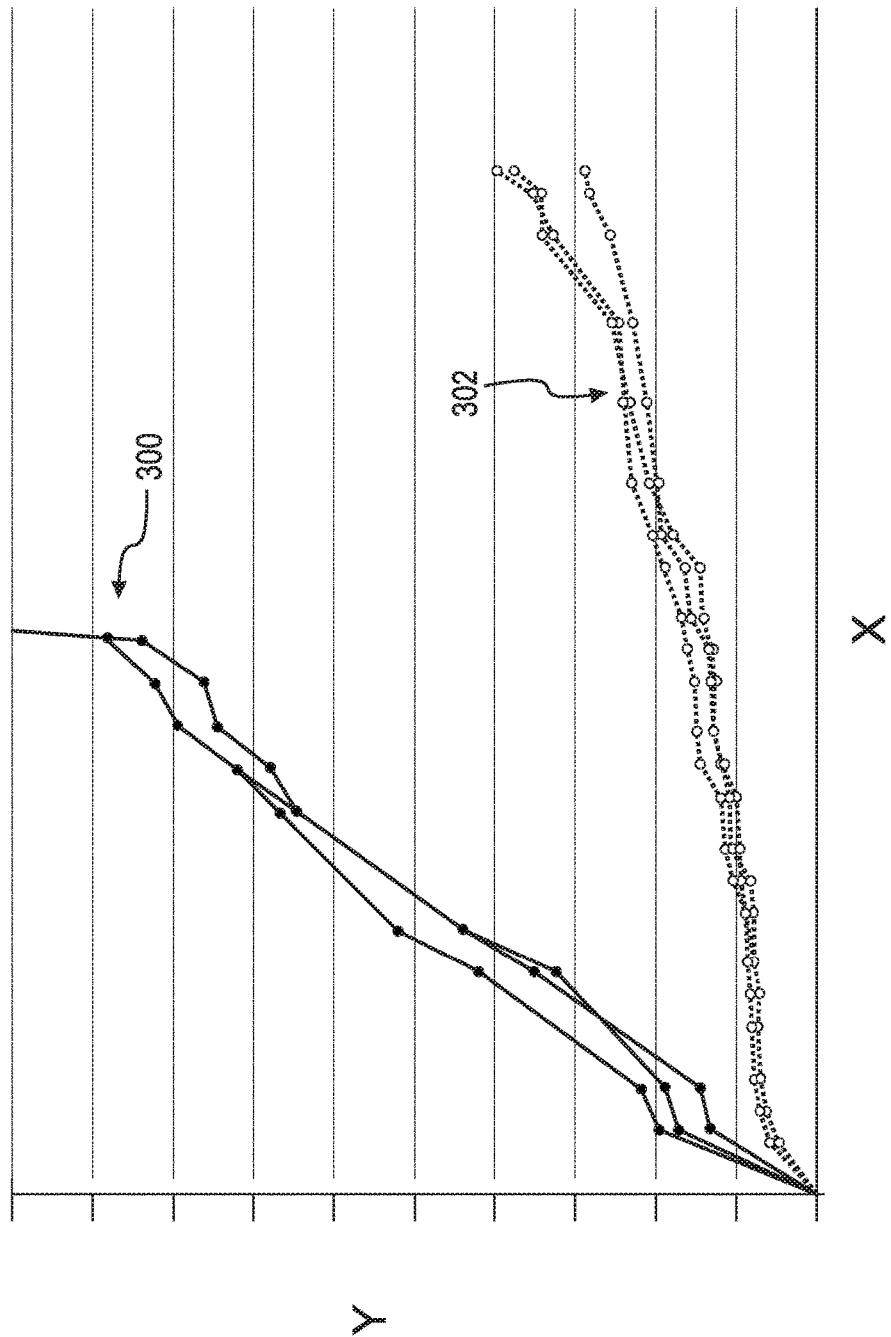

FIG. 3 is a graph plotting respective percent thickness loss (Y axis) versus number of cycles (X axis) for known friction material and friction material including tung oil and phenolic resin according to the present disclosure. Each sample was subjected to cyclic pressure cycle testing. Each cycle consisted of a 2 second period of applying 9.9 MPa of pressure followed by 3 seconds of no pressure being applied. The testing was conducted at 120° C. The samples compress during the application of pressure. The extent of compression is measured used to determine the percent thickness loss. Lower percent thickness toss indicates the sample has maintained its integrity and is indicative of maintained performance. Lines 300 depict the performance of several examples of known friction material, while lines 302 depict the performance of several examples of friction material including tung oil and phenolic resin according to the present disclosure. It has been found that the present friction material displays improved cyclic pressure cycle test results over known friction materials. For example, some testing resulted in known materials having five and six times greater percent thickness toss than the present material.

The presently disclosed friction material and method of making the same improve pressure cycle at higher temperatures without the drawback of performance loss. It has been found that the outer or exposed surface, i.e., the surface having only phenolic resin, is responsible for the performance level of the friction material as it is the only surface exposed to and contacting an adjacent reaction plate. The inner surface, i.e., the surface having only tung oil, is bonded to a plate, e.g., a clutch plate, and does not affect performance. However, the tung oil present in the fiber material binds the fiber material thereby increasing its strength, in particular, increasing the friction material strength under pressure cycle at higher temperature. Moreover, the presence of tung oil in the friction material increases the flexibility of the friction material thereby further improving the pressure cycle at higher temperatures while maintaining the performance benefit of including only phenolic resin at the exposed or outer surface.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A friction material comprising:
   a fiber material comprising a first surface, a second surface opposite the first surface and a thickness between the first and second surfaces; and,
   a filler material comprising tung oil and phenolic resin, the tung oil being saturated within the fiber material from the first surface through a first portion of the thickness and the phenolic resin being saturated within the fiber material from the second surface through a second portion of the thickness, wherein the first portion has no phenolic resin.

2. The friction material of claim 1, wherein the second portion has no tung oil.

3. The friction material of claim 1, wherein there is no blending of the tung oil and the phenolic resin at the first surface and there is no blending of the tung oil and the phenolic resin at the second surface.

4. The friction material of claim 1, wherein blending of the tung oil and the phenolic resin only occurs in an intermediate portion between the first and second portions of the thickness.

5. The friction material of claim 1, wherein the first portion of the thickness ranges between 25% and 99% of the thickness.

6. A torque converter comprising:
a cover;
an impeller connected to the cover;
a turbine in fluid communication with the impeller;
an output hub arranged to non-rotatably connect to an input shaft for a transmission; and,
a torque converter clutch comprising:
  a friction material including:
    a fiber material comprising a first surface, a second surface opposite the first surface and a thickness between the first and second surfaces, and
    a filler material comprising tung oil and phenolic resin, the tung oil being saturated within the fiber material from the first surface through a first portion of the thickness and the phenolic resin being saturated within the fiber material from the second surface through a second portion of the thickness, wherein the first portion has no phenolic resin and the second portion has no tung oil; and
  a piston displaceable to engage the friction material with the piston and the cover to transmit torque from the cover to the output hub through the friction material and piston.

7. The toque converter of claim 6, wherein there is no blending of the tung oil and the phenolic resin at the first surface and there is no blending of the tung oil and the phenolic resin at the second surface.

8. The torque converter of claim 6, wherein blending of the tung oil and the phenolic resin only occurs at an intermediate portion between the first and second portions of the thickness.

9. The torque converter of claim 6, wherein the first portion of the thickness ranges between 25% and 99% of the thickness.

10. A friction material comprising:
  a fiber material comprising a first surface, a second surface opposite the first surface and a thickness between the first and second surfaces; and,
  a filler material comprising tung oil and phenolic resin, the tung oil being saturated within the fiber material from the first surface through a first portion of the thickness and the phenolic resin being saturated within the fiber material from the second surface through a second portion of the thickness, wherein the second portion has no tung oil.

11. The friction material of claim 10, wherein the first portion has no phenolic resin.

12. The friction material of claim 10, wherein there is no blending of the tung oil and the phenolic resin at the first surface and there is no blending of the tung oil and the phenolic resin at the second surface.

13. The friction material of claim 10, wherein blending of the tung oil and the phenolic resin only occurs in an intermediate portion between the first and second portions of the thickness.

* * * * *